United States Patent [19]

Tsukamoto

[11] Patent Number: 5,051,554
[45] Date of Patent: Sep. 24, 1991

[54] ELECTRIC DISCHARGE MACHINE

[76] Inventor: Atsuko Tsukamoto, c/o Mitsubishi Denki Kabushiki Kaisha, Nagoya Works, No. 1-14, Yadaminami 5-chome, Higashi-ku, Nagoya-shi, Aichi, Japan

[21] Appl. No.: 558,359

[22] Filed: Jul. 27, 1990

[30] Foreign Application Priority Data

Aug. 4, 1989 [JP] Japan ................... 1-201433

[51] Int. Cl.⁵ ........................... B23H 7/16; B23H 7/18
[52] U.S. Cl. ............................. 219/69.19; 219/69.13; 219/69.16
[58] Field of Search ................ 219/69.13, 69.16, 69.19

[56] References Cited

U.S. PATENT DOCUMENTS 4,733,040 3/1988 Pelloni et al. ............... 219/69.19
4,891,487 1/1990 Nakata ........................ 219/69.16

FOREIGN PATENT DOCUMENTS 55-20813 6/1980 Japan .
62-15022 1/1987 Japan .
62-15023 1/1987 Japan ........................... 219/69.19

Primary Examiner—Geoffrey S. Evans

[57] ABSTRACT

An electric discharge machine minimizes a recovery period of time by obtaining an optimum direction of movement for eliminating a short circuit based on data stored concerning the configuration (i.e. shape) of the electrode, the current position of the electrode, and the deepest position reached by the electrode during machining.

4 Claims, 3 Drawing Sheets

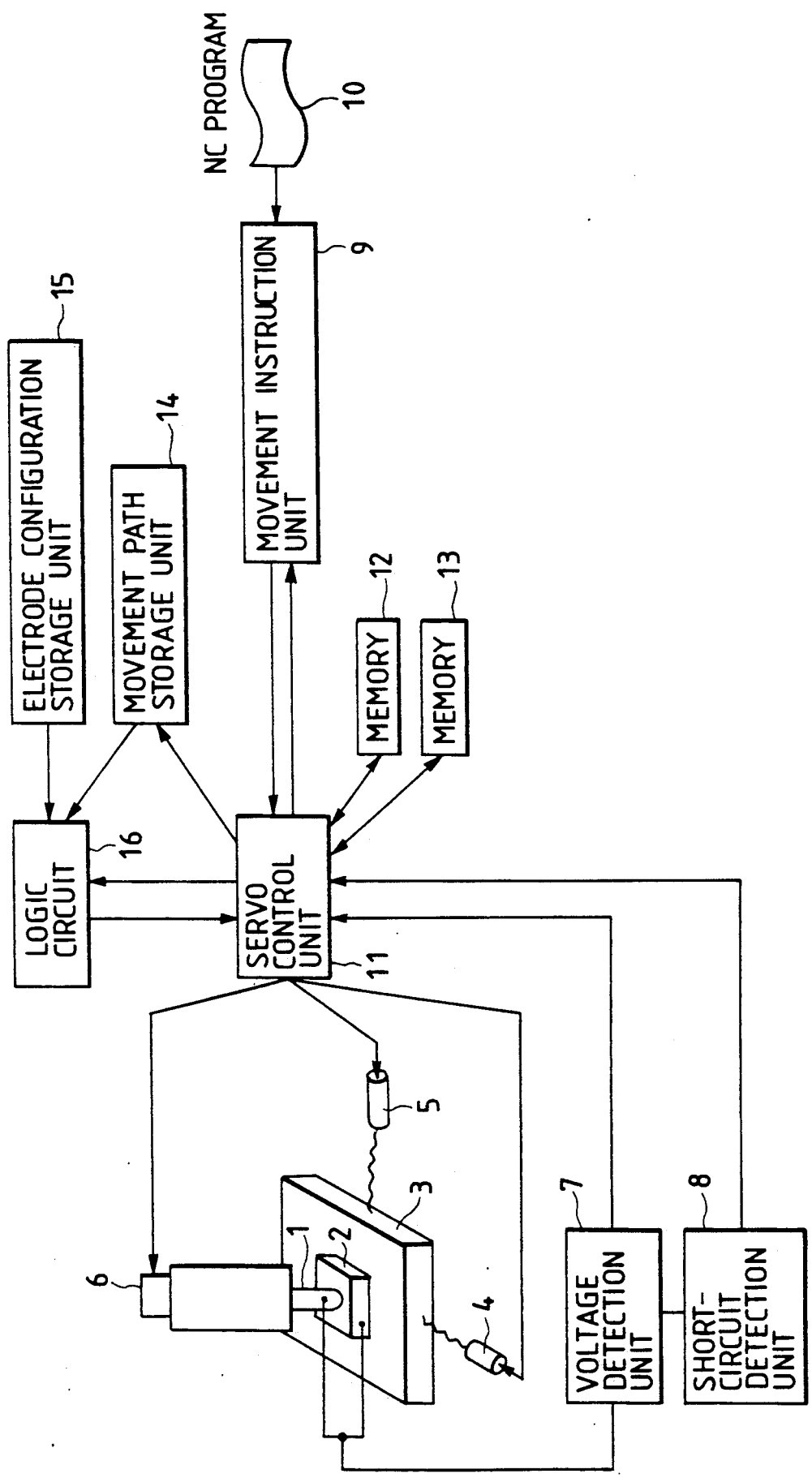

ELECTRIC DISCHARGE MACHINE

BACKGROUND OF THE INVENTION

The present invention relates to an electric discharge machine capable of curtailing a dead time during which an electrode moves backward immediately after a shortcircuit occurs between the electrode and a workpiece to be machined during its operation, and then moves forward to start the machining operation again.

FIG. 1 is a schematic diagram showing the construction of a conventional electric discharge machine of this type. In FIG. 1, reference numeral 1 designates an electrode; 2, a workpiece to be machined; 3, a table; 4, a Y-axis motor for moving the table 3 in the direction of Y-axis; 5, an X-axis motor for moving the table 3 in the direction of X-axis; 6, a Z-axis motor for moving the electrode 1 in the direction of Z-axis; 7, a voltage detection unit for detecting an interelectrode gap voltage between the electrode 1 and the workpiece 2; 8, a shortcircuit detection unit for detecting a shortcircuit occurring between the electrode 1 and the workpiece 2 from the interelectrode gap voltage detected by the voltage detection unit 7; and 9, a movement instruction unit for calculating data to be applied to each motor 4, 5, or 6.

An operation of this conventional machine will be described with reference to FIG. 2 showing an example of movement of the electrode 1. During the machining, the electrode 1 moves spirally to machine the workpiece 2 along a machining locus 101 as instructed by the movement instruction unit 9. Upon an occurrence of a shortcircuit between the electrode 1 and the workpiece 2, the forward movement operation along the machining path 101 instructed by the movement instruction unit 9 is interrupted at a position 102 and the electrode 1 is then caused to move backward in a predetermined direction 103. Upon recovery from the shortcircuit, the electrode 1 is caused to return in reverse 104 to the position 102 at which its forward movement has been interrupted, so as to resume the machining operation along the machining path 105 instructed by the movement instruction unit 9.

Since the conventional electric discharge machine is constructed as described above, the backward movement of the electrode 1 is carried out according to one suitable mode selected by the operator from the group of predetermined backward movement modes, the thus selected mode being unchanged during the machining operation. Thus, with such a conventional machine, there have been some cases where the backward movement may result in redundancy depending on the machining path or the electrode configuration. More specifically, in the case where at least a part of the electrode 1 moves along the already machined path, there is a possibility that such a backward movement results in the fact that, no matter how the electrode 1 moves backward, it is impossible to recover from the shortcircuit between the electrode 1 and the workpiece 2 quickly resulting in requiring a long time to recover the shortcircuit.

SUMMARY OF THE INVENTION

This invention has been made to overcome the above problems and an object of the present invention is to provide an electric discharge machine capable of recovering from a shortcircuit quickly and shortening a dead time required to retract an electrode after an occurrence of shortcircuit and then to resume a machining operation. With such an electric discharge machine according to the present invention, an optimal direction of backward movement is obtained according to both a machining path and an electrode configuration so that the electrode is moved backward in the thus obtained direction.

The electric discharge machine according to the present invention comprises: a plurality of motors for moving a workpiece and an electrode to predetermined positions; a servo control unit for controlling the forward and backward movements in machining by controlling the plurality of motors; an electrode configuration storage unit for storing a configuration of the electrode; a movement path storage unit for storing a movement path of the electrode; and a logic circuit not only for calculating an optimal movement vector along which the electrode moves backward with respect to the workpiece either from both an electrode configuration and a movement path of the electrode stored in the storage units or from both an electrode configuration stored in the electrode configuration storage unit and data of an NC program in which data such as a machining configuration are stored in advance but also for applying the calculated optimal movement vector to the servo control unit.

In the present invention, the logic circuit calculates an optimal direction for backward movement according to both an electrode configuration and a machining path, and the servo control unit causes the electrode to move backward in the calculated direction. Therefore, a dead time during which the electrode moves first backward and then forward upon an occurrence of a shortcircuit can be shorted.

BRIEF DESCRIPTION OF THE DRAWINGS

In the accompanying drawings:

FIG. 3 is a block diagram showing an embodiment of an electric discharge machine according to the present invention.

DESCRIPTION OF THE PREFERRED EMBODIMENT

Figure 1:
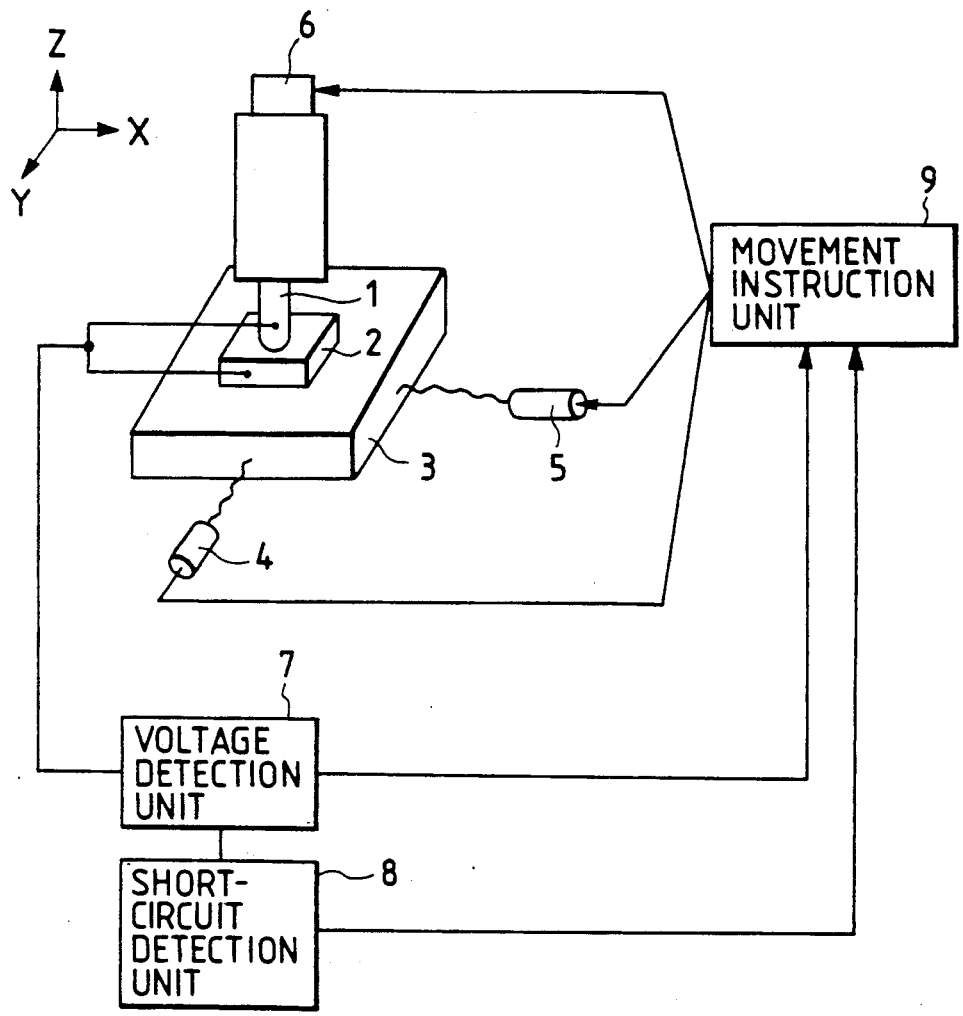
FIG. 1 is a schematic diagram showing the arrangement of a conventional electric discharge machine.
Figure 2:
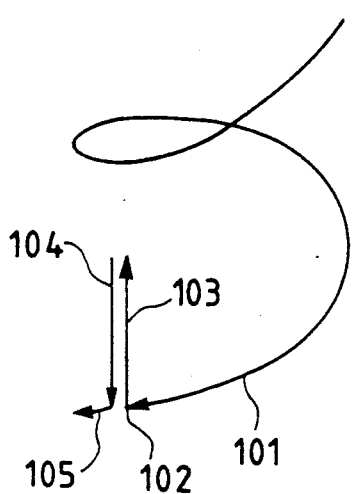
FIG. 2 is a diagram illustrating a machining path and a retracting path of an electrode.
Figure 4A:
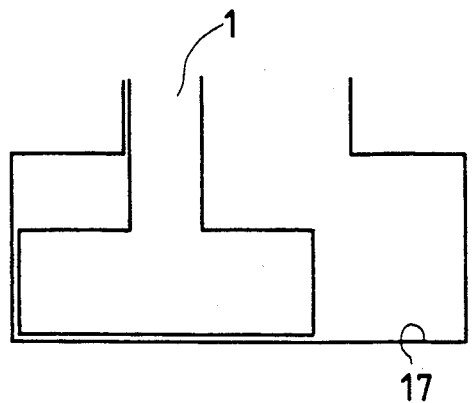
FIGS. 4(a), 4(b), 4(c), and 4(d) are diagrams, each showing the positional relationship between an electrode and a workpiece.
Figure 4B:
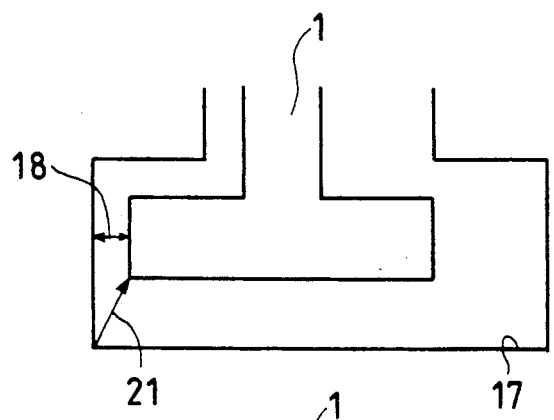
Figure 4C:
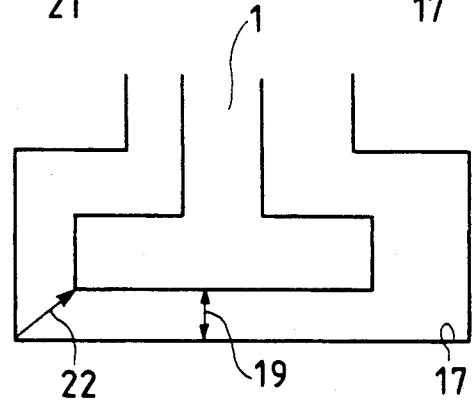
Figure 4D:
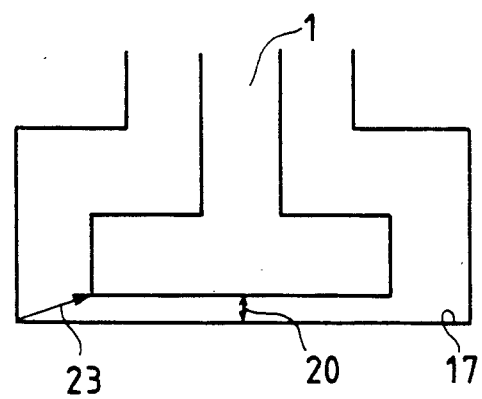

An embodiment of the present invention will be described with reference to FIG. 3, which is a block diagram showing the arrangement of an electric discharge machine. In the figure, reference numerals 1 through 8 designate the same or corresponding parts and components as those in the conventional machine shown in FIG. 1. Referring to the figure, reference numeral 9 designates a movement instruction unit for analyzing an NC program 10 and producing a movement reference value; 11, a servo control unit for controlling the Y- and X-axis motors 4 and 5 to move the table 3 and for controlling the Z-axis motor 6 to move the electrode 1 to control the machining operation, respectively; 12, a memory for storing the deepest position of the electrode 1 during the machining operation; 13, a memory for storing the current position of the electrode 1; 14, a movement path storage unit for storing a movement path of the electrode 1; 15, an electrode configuration storage unit for storing a configuration of the electrode 1; and 16, a logic circuit for calculating an optimal direction of backward movement taking into account both an electrode configuration and an electrode movement path stored in these storage units 14 and 15, respectively. FIG. 4 is a diagram showing the positional relationship between the electrode 1 and the workpiece 2. FIG. 4(a) shows the positions of the electrode 1 and the machining surface 17 at the time when a shortcircuit occurs during machining, whereas FIGS. 4(b), 4(c), and 4(d) show minimum values 18, 19, and 20 of the distance between the electrode 1 and the machining surface 17 and backward movement vectors 21, 22, and 23 in cases of making a backward movement by an equal distance in a different direction.

Then, an operation of the machine of this embodiment thus constructed will now be described. Upon start of the machining, the servo control unit 11 applies a movement instruction request to the movement instruction unit 9. The movement instruction unit 9 analyzes the NC program 10 to apply a movement reference value to the servo control unit 11.

In the absence of a shortcircuit signal from the shortcircuit detection unit 8, the servo control unit 11 applies the movement reference value from the movement instruction unit 9 to the respective motors 4, 5, and 6 to thereby move both the electrode 1 and the table 3 to achieve the machining operation. In addition, the servo control unit 11 controls the memories 13 and 12 to add the movement reference value to the current contents of the memories 13 and 12 to be stored as a value representing a current position in the memory 13 and as a value representing the deepest position during the machining operation in the memory 12, respectively. On the other hand, when a shortcircuit has been detected by the shortcircuit detection unit 8, the servo control unit 11 stops the movement instruction request and then applies a backward movement instruction request to the logic circuit 16.

The logic circuit 16 not only calculates the machining surface 17 of the workpiece 2 from both the electrode configuration data in the electrode configuration storage unit 15 and the electrode movement path data in the movement path storage unit 14, but also calculates an optimal backward movement vector 22 such as the largest value 19 out of the minimum values 18, 19, and 20 of the distance between the machining surface 17 and the electrode 1 when the machine has been moved by the number of steps calculated by the servo control unit 11 on the basis of the interelectrode gap voltage between the electrode and the workpiece detected by the voltage detection unit 7. The calculated vector 22 is fed to the servo control unit 11. That is, to eliminate the shortcircuit between the electrode 1 and the workpiece 2, it is necessary that the electrode 1 and the workpiece 2 be apart from each other as much as possible at every point on the machining surface 17. A minimum value between the electrode 1 and the machining surface 17 is calculated in every direction, and it is in the direction in which such calculated minimum value becomes largest that the machine is required to move backward.

The servo control unit 11 calculates an output value to be applied to each of the axis motors 4, 5, and 6 both from the optimal backward movement direction and from the distance of optimal backward movement calculated from the voltage between the electrode and the workpiece, and applies the calculated output values to the motors thereby to cause the electrode 1 to move backward with respect to the workpiece 2. At the same time, the servo control unit 11 also updates the current position by adding to the memory 13 the output value at the time the electrode moved backward. This backward movement process is continued until there is no output of a shortcircuit signal from the shortcircuit detection unit 8.

By the way, the optimal distance of backward movement can be obtained as follows.

Optimal distance of backward movement = $k_1(E-e) + k_2\Delta E$ where

E: voltage between the electrode and the workpiece
e: set voltage
$\Delta E$: differential term
$k_1, k_2$: constant Generally, a shortcircuit occurs when the voltage E between the electrode and workpiece and the set voltage e are compared and their difference becomes negative. Therefore, the voltage between the electrode and the workpiece at the time of shortcircuit has a range and the optimal distance of backward movement differs depending on the range. That is, the smaller the voltage between the electrode and the workpiece is at the time of shortcircuit, the greater the distance of backward movement becomes.

When there is no longer any shortcircuit signal applied from the shortcircuit detection unit 8, the servo control unit 11 stops its output of a backward movement instruction request to the logic circuit 16, and causes the machine to move in a forward direction along the movement path stored in the movement path storage unit 14 to the deepest position in the memory 12, and when the data in the memory 12 coincides with the current position in the memory 13, the servo control unit 11 feeds a movement instruction request to the movement instruction unit 9 thereby to cause the machine to proceed with the machining. The machining operation is proceeded by repeating the above backward and forward movements.

Although the above embodiment is constructed so that the logic circuit 16 calculates the optimal direction for backward movement based on the backward movement instruction request of the servo control unit 11, it may be so constructed that the machining configuration at any point of a machining process can be predicted from both the electrode configuration and the NC program 10 by analyzing the NC program 10 in advance and that optimal directions for backward movement at every electrode position are simulated by following the same process as the above-described embodiment as to the distance between the machining surface and the electrode in the predicted machining configuration. Even in such a case, the advantage similar to that of the above embodiment will be obtained.

As described above, according to the present invention, the electrode is moved backward in the direction determined by calculating an optimal direction of backward movement based on both the electrode configuration and the machining path, so that it is possible to provide a large distance between the electrode and the workpiece at every point over the machining surface. Thus, it contributes to not only recovering from shortcircuits quickly but also curtailing a dead time during which the electrode moves backward and then forward again, thereby providing the advantage of improving the machining speed.

What is claimed is:

1. An electric discharge machine in which a workpiece is machined by an electric discharge generated between said workpiece and an electrode comprising:
   a plurality of motors for moving a workpiece and an electrode during a machining operation;
   a control means for controlling said plural motors to control movement of said electrode relative to said workpiece according to an NC program;
   a storage means for storing a configuration of said electrode and positions of said electrode during the machining operation, a movement path of said electrode;
   means for detecting an occurrence of shortcircuit between said electrode and workpiece with reference to variation in an interelectrode gap voltage appearing therebetween; and
   means for calculating an amount of movement and an optimal movement direction along which said electrode moves backward with respect to said workpiece upon the occurrence of shortcircuit between said electrode and workpiece, based on at least data as to an electrode configuration stored in said storage means,
   said control means controlling said plural motors in response to an output of said calculating means.

2. The electric discharge machine as defined in claim 1 wherein said storage means stores data representing a current position and the deepest position in a Z-axis direction of said electrode during the machining operation, and said calculating means calculates the amount of movement and the optimal movement direction based on the data as to the electrode configuration, the current position and the deepest position.

3. The electric discharge machine as defined in claim 2 wherein the distance between said workpiece and electrode is made maximum when said electrode is moved by the thus calculated amount of movement in the optimal movement direction.

4. The electric discharge machine as defined in claim 3 wherein the amount of movement is determined as a function of the interelectrode gap voltage.

* * * * *